United States Patent [19]

Perry

[11] 4,152,554
[45] May 1, 1979

[54] HOOKSWITCH MECHANISM FOR TELEPHONE HANDSET

[75] Inventor: Bobby D. Perry, Corinth, Miss.

[73] Assignee: International Telephone and Telegraph Corporation, New York, N.Y.

[21] Appl. No.: 887,961

[22] Filed: Mar. 20, 1978

[51] Int. Cl.² ............................................. H04M 1/08
[52] U.S. Cl. ................................................... 179/164
[58] Field of Search ....................... 179/163, 164, 165

[56] References Cited

U.S. PATENT DOCUMENTS

| | | | |
|---|---|---|---|
| 552,705 | 1/1896 | Coy | 179/163 X |
| 2,165,693 | 7/1939 | Bross | 179/165 X |
| 3,824,353 | 7/1974 | Howe | 179/164 |

*Primary Examiner*—William C. Cooper
*Attorney, Agent, or Firm*—James B. Raden; Marvin M. Chaban

[57] ABSTRACT

A hookswitch mechanism adapted to be operated responsive to movement of the cradle of a telephone instrument. The hookswitch mechanism has a plunger, axially operable to open and close contacts. The movable contacts are rectangular strips mounted on the movable plunger body. A housing encloses the plunger body and mounts the stationary contacts adjacent the ends of the contact strips. The mechanism is mounted on a bracket which also supports the cradle for pivotal movement thereby ensuring the relative positioning and alignment of cradle and hookswitch mechanism.

11 Claims, 11 Drawing Figures

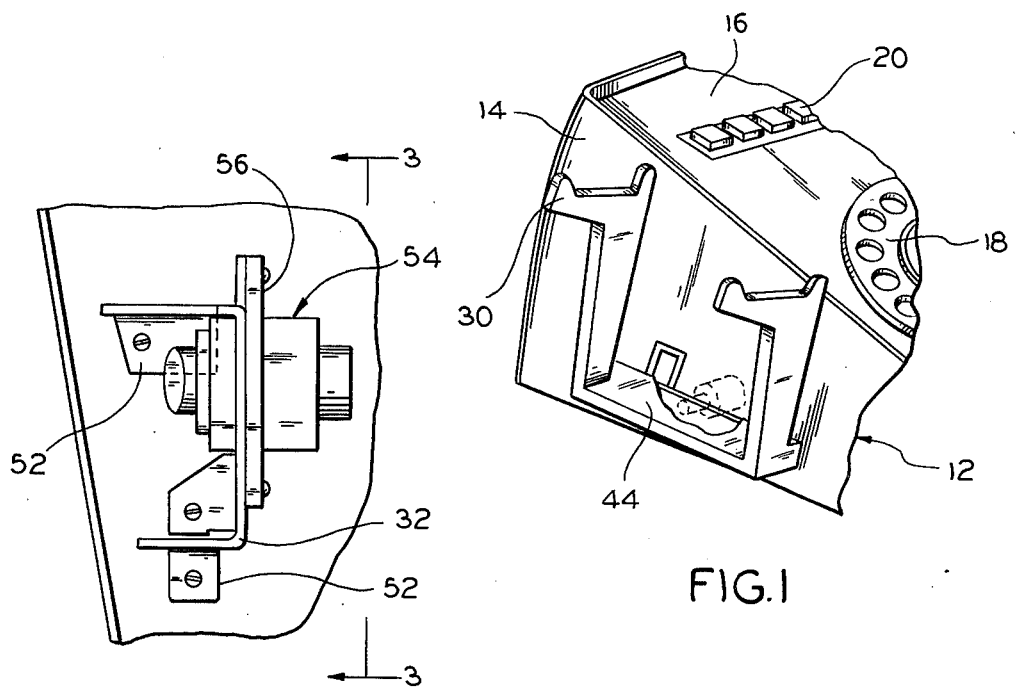
FIG.1
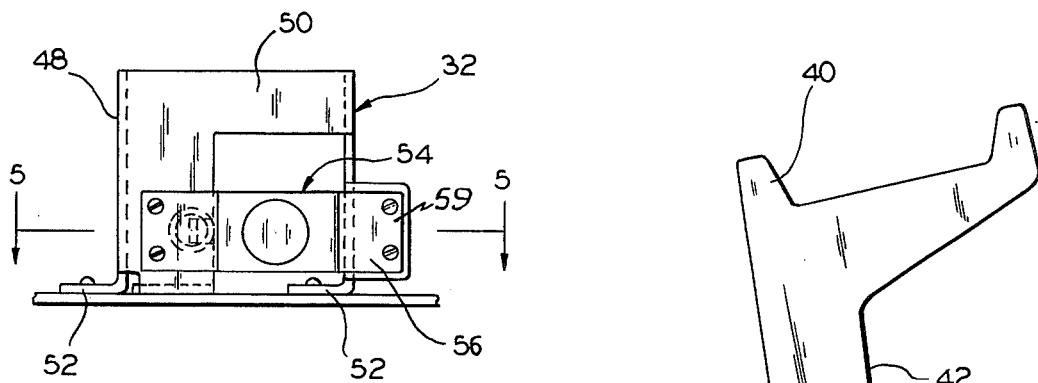
FIG.2
FIG.3
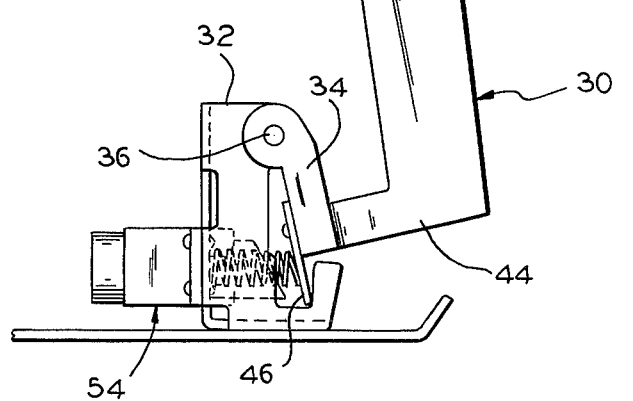
FIG.4

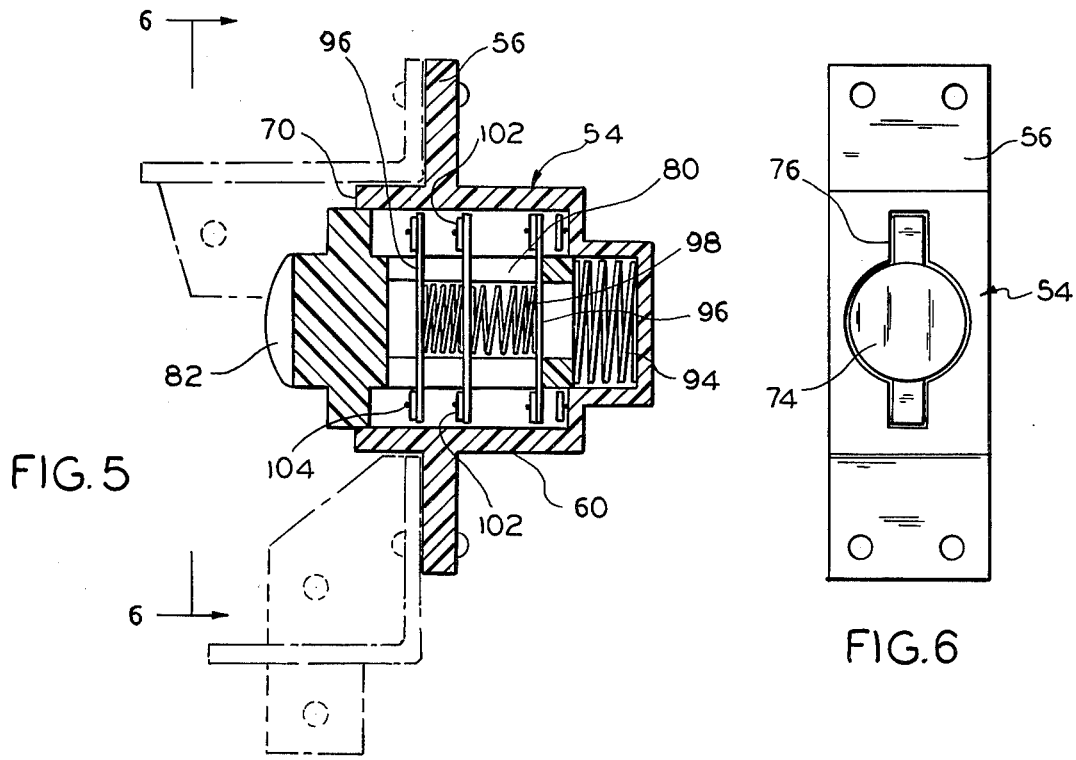
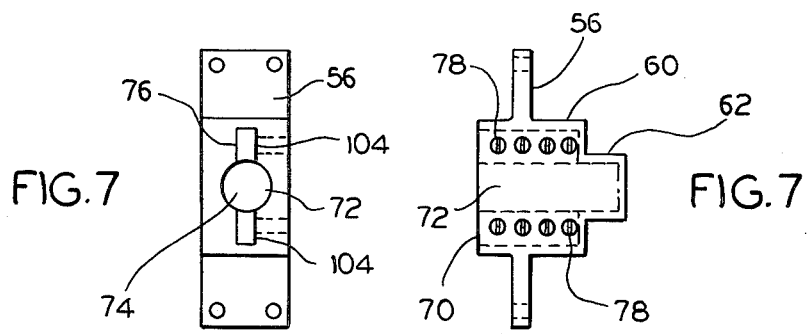
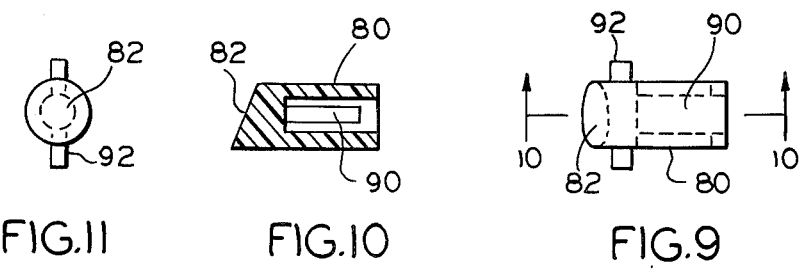

HOOKSWITCH MECHANISM FOR TELEPHONE HANDSET

BACKGROUND OF THE INVENTION

Hookswitch mechanisms are of course well-known in the telephone arts and may be traced back to the very early 1900's, as for example U.S. Pat. No. 982,213 issued Jan. 17, 1911. In the telephones in use in the 1940's and still in use at this time, plunger type hookswitches are frequently located between the tines of the telephone cradle. For examples see U.S. Pat. Nos. 2,199,686 to Beyland issued May 7, 1940 and 2,273,530 issued Feb. 17, 1942 to D. King. In these telephones, the plunger acted on one arm of a bell crank to pivot the bell crank and operate a leaf spring pileup. Pivotal cradles are also known. In U.S. Pat. No. 3,440,366 issued to Samios on Apr. 22, 1967, a pivotal cradle is shown as pivoting a lever arm to operate leaf spring contacts. Later, U.S. Pat. Nos. 3,818,150 issued to Kunimine on June 18, 1974 and 3,903,070 issued to Kunimine et al on Sept. 2, 1975 showed pivotal cradles, the cradles acting through a translatory comb to operate leaf spring contacts.

Plunger operated switches are also known in other electrical arts such as the vacuum cleaner switch shown by U.S. Pat. No. 3,867,591 issued Feb. 18, 1975 to Nordeen.

SUMMARY OF THE INVENTION

The present invention is directed to a plunger-type hookswitch mechanism for use with a pivotal handset cradle. As is customary with one style of telephone instrument, the handset cradle is pivoted on an axis parallel to the side of the instrument. The cradle pivot has a lever arm moved toward the side of the instrument on placement of the handset in the cradle.

The hookswitch mechanism comprises a plunger in the line of travel of the lever arm. Spaced along the body of the plunger are bridging contacts moved axially of the plunger on plunger movement. Adjacent the respective bridging contacts and outside the plunger body but within an enclosing housing are stationary contacts to make and break circuits responsive to movement of the lever arm. Restoring of the plunger on removal of the handset from the cradle is controlled by compression springs axially disposed relative to the plunger body.

It is therefore an object of the invention to provide a new and improved plunger operated hookswitch for use on a telephone instrument.

It is a further object of the invention to provide a new and improved telephone hookswitch using a plunger switch having a plurality of levels of contacts spaced along the plunger body.

It is a still further object of the invention to provide a telephone hookswitch mechanism comprised of a plunger movable axially with axially spaced armature contacts mounted in the plunger body to break and make circuit paths to stationary contacts externally of the plunger body.

It is also an object of the invention to provide a plunger operated telephone hookswitch in which there are a plurality of contact levels spaced axially along the plunger body to make and break contact paths accordingly at the various levels on axial movement of the plunger body.

BRIEF DESCRIPTION OF THE INVENTION

FIG. 1 is a partial perspective view of a telephone instrument employing my invention;

FIG. 2 is a plan view of the plunger mechanism of FIG. 1;

FIG. 3 is a rear elevation taken along line 3—3 of FIG. 2;

FIG. 4 is a side view in elevation of the hookswitch mechanism and handset cradle of FIG. 1;

FIG. 5 is a sectional view taken along line 5—5 of FIG. 3;

FIG. 6 is a front view of the plunger mechanism viewed along line 6—6 of FIG. 5;

FIG. 7 is a side view in elevation of the plunger housing of the plunger of FIG. 5;

FIG. 8 is a front view in elevation of the plunger housing of FIGS. 5-7; and

FIGS. 9, 10 and 11 are respectively side elevation, section, and front elevational views of the body of the plunger of FIG. 5.

DETAILED DESCRIPTION OF THE INVENTION

In FIG. 1, I show a portion of a telephone station instrument 12, the left side 14 and face 16 being shown. The instrument 12 is shown with a rotary dial 18 and lighted station push buttons 20, these features being shown as exemplary of a telephone station instrument.

A unitary handset cradle 30 is shown pivotally mounted to a bracket 32, the bracket being secured to the interior of the instrument. Suitable slots in the wall of side 14 not shown receive the cradle pivot arms 34 to enable the main portion of the cradle to extend externally of the instrument and yet be pivoted on pivot axis 36 to bracket 32 within the instrument.

The cradle has spaced-apart handset receiving tines 40. The tines each being connected integrally to an upright post 42, the posts 42 being joined in a connecting bar 44, as is conventional.

The connecting bar 44 has extending therefrom two spaced pivot arms 34, the arms being pivotal about axis 36. Secured to the pivot arms or to an extension of connecting bar 44 is an operating lever arm 46 which is secured by screw fasteners to the otherwise unitary handset cradle 30.

As mentioned, the cradle is mounted on a pivotal shaft rotatable on axis 36, the shaft being journaled in bracket 32. Bracket 32 is a complex shaped member which is affixed to the base plate of the telephone instrument within the instrument. The bracket journals the cradle and its operating lever arm and supports and positions the plunger mechanism relative to the cradle lever. One compression spring acts between the lever arm 46 and bracket 32 to restore the cradle to its off-hook state with the weight of the handset (not shown) removed from the cradle.

For this purpose, the bracket has a pair of spaced uprights 48 joined in a vertical strengthening wall 50 with mounting pads 59 arrayed in a vertical plane for supporting the plunger mechanism 54.

The plunger mechanism 54 has an outer housing 60 with side wing members 56 for connection to the mounting pads 59 by screws and the like. The plunger outer housing 60 is of rectangular cross section, preferably fabricated or molded of thermoplastic material in a shape as seen best in FIGS. 6 and 8 with a central cylindrical rear section 62. The front wall 70 of the housing has a central opening 72 comprised of a circular central portion 74 and rectangular side section 76. Along one side of the housing, the housing wall has paired circular openings 78 (four pairs being shown in FIG. 7). The openings of a pair include one opening on each side of the centerline of the housing and spaced a distance from the centerline.

Mounted internally in the housing and extending from the rear central sections to the front opening is a plunger body 80. The body has a sloped operating head 82 extending out of the front opening 72, the body being tubular and aligned in the center of the housing, the rear of the tubular body resting within the cylindrical rear section 62. The sidewall of the tubular body is slotted with an elongated slot 90 axial to the tube body on opposed diametrical sides of the body. Aligned with these slots, but forward along the plunger body are two side projections 92 from the plunger body and preferably molded integrally therewith.

The plunger body is depressible axially in the plunger housing against the compressive force of a main restoring spring 94 within the rear central section and bearing against the rear of the plunger tube with the projections 92 tracked within side sections 76 of the front opening.

The slots 90 in the tubular body of the plunger receive conductive strips 96 of rectangular shape. The conductive strips are axially spaced-apart by compression springs 98 held axially in the tubular body and suitably insulated from electrical contact with the conductive strips. The strips with press-in terminals are inserted into the slots 90 to extend substantially an equal distance on both sides of the body. These strips move axially with the plunger body on movement and act as armature contacts.

The stationary contacts 102 for making and breaking circuit paths through the armature contacts comprise rectangular conductive strips inserted into the housing body through paired openings 78. The conductive strips each have a wire 104 connected to it to make the circuit connection. The stationary strips rest along the centerline of the plunger housing outwardly of the plunger body and in the path of travel of the respective armature springs.

As seen best in FIG. 5, the contact pairings shown herein include two break combinations and a break-make combination. The armature strips are moved by the plunger axially to respectively bridge or break the bridge between the paired stationary conductive strips.

The paired openings 78 in the housing are standard terminal openings with each entrance to an opening 78 being circular with its sidewall tapered at its inward end toward a rectangular inner compartment in communication with the central cavity of the plunger housing. The taper channels a stationary conductive strip into position partially held within the inner compartment with a free end cantilevered into the plunger housing cavity. With paired like openings, stationary contactors are positioned on opposed sides of the plunger along the centerline of the housing cavity.

I claim:
1. A hookswitch mechanism adapted to be mounted on a telephone instrument for operation thereof by the cradle for receiving a handset of said telephone instrument, said mechanism including a plunger translatable axially within an enclosing housing in response to pivotal movement of a base section of said cradle, said housing bearing a plurality of contact closure members substantially normal to the axis of said plunger, means responsive to axial movement of said plunger for opening and closing circuit paths including said contact closure members, and wherein said plunger comprises a head adapted to be engaged by said cradle and a tubular body secured to said head for axial movement therewith.

2. A mechanism as claimed in claim 1, in which there are opposed axial slots in the sidewall of said tubular body for holding said circuit path opening and closing means, and in which there are means for spacing respective ones of said opening and closing means axially along said body.

3. A mechanism as claimed in claim 1, in which said plunger head is configured with a cradle engaging surface obliquely disposed relative to the axis of said plunger.

4. A mechanism as claimed in claim 2, in which said housing comprises a rectangular body surrounding said plunger body, and in which there are a plurality of pairs of spaced openings in said housing body with each pair in alignment for receiving stationary contact closing members.

5. A mechanism as claimed in claim 4, in which opening and closing means each comprise a transverse flat contact strip with the strip ends positioned to make and break circuits relative to said stationary contact closing members.

6. A hookswitch mechanism adapted to be mounted in a telephone instrument for operative response to the movement of a handset cradle member pivotal about a first axis to pivot a switch operating arm, said mechanism comprising a plunger assembly mounted for translatory movement in a direction normal to said first axis, said plunger assembly including a striking face operably adjacent said arm to respond to pivotal movement of said arm, said plunger assembly including a tubular body translatable with said plunger face, a housing body enclosing said plunger, and a plurality of spring contact members spaced along said tubular body and movable therewith to effect circuit closures to stationary contacts mounted in said housing.

7. A hookswitch mechanism as claimed in claim 6, in which there are means in said housing body constraining said tubular body to translatory movement therein.

8. A hookswitch mechanism as claimed in claim 6, in which there is a radial opening in said tubular body for receiving a flat rectangular conductive contact strip for translatory movement with said plunger relative to said stationary contacts.

9. A hookswitch mechanism as claimed in claim 8, in which there are a plurality of flat rectangular conductive strips extending radially through said tubular body and means for spacing apart said strips in a direction axial to said plunger body.

10. A hookswitch mechanism as claimed in claim 9, in which said stationary contacts comprise conductive members respectively aligned inwardly of the transverse ends of the contact strips and adjacent said transverse ends.

11. A hookswitch mechanism as claimed in claim 10, in which there is a pivotal bracket mounting said cradle for pivotal movement and for holding said plunger housing and plunger relative to said cradle and the base section thereof.

* * * * *